Jan. 17, 1939. A. A. MURISON 2,144,194

CLOSURE FOR BOTTLES OF PAPER AND OTHER MATERIALS

Filed Nov. 29, 1937

Inventor
Alexander A. Murison
By A. P. Greeley
Attorney

Patented Jan. 17, 1939

2,144,194

UNITED STATES PATENT OFFICE 2,144,194

CLOSURE FOR BOTTLES OF PAPER AND OTHER MATERIALS

Alexander A. Murison, Arlington, Va., assignor to The Purity Paper Vessels Company, Baltimore, Md.

Application November 29, 1937, Serial No. 177,141

4 Claims. (Cl. 229—5.6)

My invention relates to closures for bottles of paper or other material and has for its object to provide a cap closure for paper milk bottles so constructed as to be applied to the paper bottle before it leaves the factory at which it is made and before it is filled with milk.

Milk bottles of paper while extensively used are found objectionable in some localities by the authorities having supervision of milk supply because of the fact that the paper bottles supplied to the dairyman in open condition, as has been usual heretofore, afford opportunity for entrance of bacteria through their open mouths. While glass bottles as delivered to the dairyman are usually open and afford opportunity for entrance of bacteria, glass bottles may be washed and so freed from bacteria before being filled with milk. Paper bottles cannot be so washed.

In order to make it possible to use paper bottles for milk dairymen have in some cases made the bottles at the dairy so as to avoid contamination which is possible when open bottles are transported a substantial distance, but it has been found impractical to load the dairy with the expense of making the bottles.

Under conditions as they are it is recognized as essential to the use of paper bottles for milk that the bottles shall not be subject to the danger of contamination after they are manufactured and before they reach the dairy at which they are to be filled.

It is the particular object of the present invention to provide a closure for milk bottles which will avoid any danger of contamination in transporting from the place of manufacture to the place where they are to be filled with milk.

With the above stated object and other objects hereinafter explained in view my invention consists in and comprises the construction hereinafter set forth and claimed.

Referring to the drawing.

Figure 1:
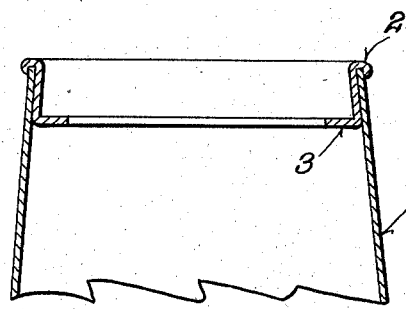
Figure 1 is a longitudinal sectional view of the upper end of a paper milk bottle in the condition in which it has heretofore usually been transported from the place of manufacture to the dairy where it is to be filled.

In the drawing 1 indicates the body of a paper bottle for milk or other liquid and is shown as of conical form though it may be of other than conical form. 2 indicates a stiffening ring applied to the bottle neck with its outer edge portion crimped onto the edge of the bottle and with an inwardly extending flange 3 at its lower end. This is a usual construction and in the usual practice a sealing cap applied after the bottle is filled rests with its central disc on ledge 3 and has its outer end portion crimped over the crimp at the outer edge of ring 2. The bottle as shown in Figure 1 is in practice usually transported from its place of manufacture with its mouth open and has been found objectionable because the open mouth may permit bacteria or other contamination to enter.

In carrying out my invention a sealing cap 4 of waxed material is applied to the mouth of the bottle immediately after the bottle is made and while the wax of the bottle and of the cap is warm and plastic thus ensuring completeness of closure before it is exposed to possible contamination. This sealing cap 4 is usually of waxed paper but may be of metal such as aluminum and is shown of usual form comprising a ring 5 and a disc 6 at the lower end of the ring which when in position rests on a flange 3 of ring 2. In this disc 6 is formed a short distance from its edge an incision 7 parallel with the periphery of the disc but not extending about the entire circumference so that the portion of the disc within the incision 7 at points 8, 8, is held by sufficient unsevered material to hold the inner portion of the disc in place until forcibly displaced.

After incision 7 is made disc 6 is coated with paraffine or other sealing material adapted to close the incision 7 against the passage of air in or out.

Figure 2:
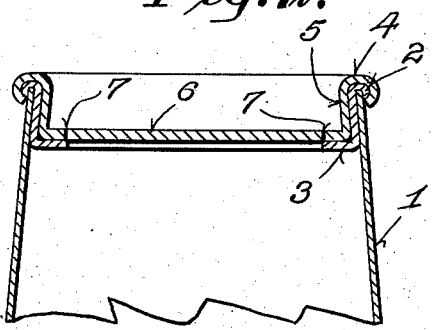
Figure 2 is a similar view showing the sealing cap as applied when the bottle is made.
Figure 3:
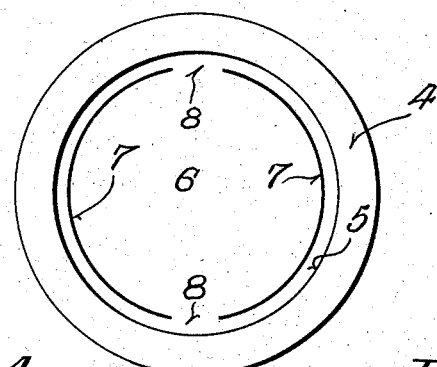
Figure 3 is a top plan view of the sealing cap shown in Figure 2.

The bottle as shown in Figure 2 is ready for transportation to the dairy without possibility of entrance into it of any bacteria or other contaminating substance.

Figure 4:
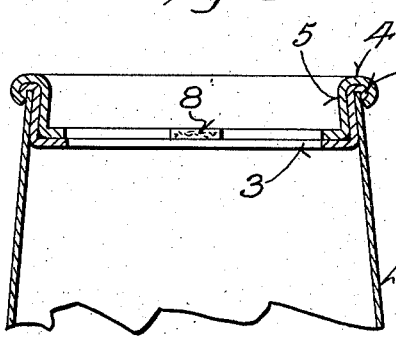
Figure 4 is a view similar to Figures 1 and 2, but showing the bottle with the disc of the sealing cap removed to permit the bottle to be filled.

When the bottle is to be filled slight pressure on one side of the disc 6 will break the sealing material closing the incision 7 and will permit the inner portion of the disc to be removed so as to leave the mouth open as shown in Figure 4 for admission of milk.

Figure 5:
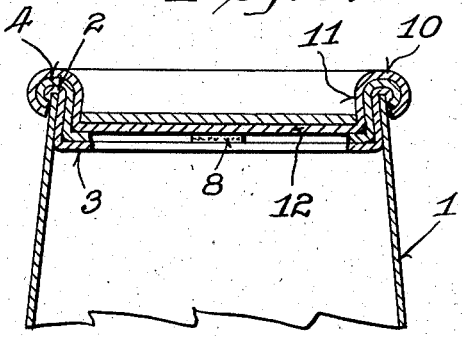
Figure 5 is a view similar to Figures 1, 2 and 4, but showing the outer sealing cap applied.
Figure 6:
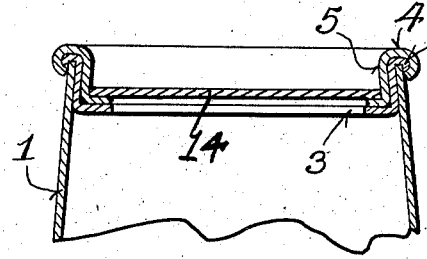
Figure 6 is a view similar to Figure 5 but showing a sealing disk instead of a cap.

After the bottle is filled an outer sealing cap 10 of commonly used form as shown in Figure 5 comprising ring 11 with disc 12 at its lower end may be placed in position and be held in position by crimping its outer edge over the crimped outer edge of inner sealing cap 4, but the sealing may be effected by a disk 14 which rests on the ledge of the sealing cup 4 with its edge against ring 5 as shown in Figure 6.

While my invention is particularly adapted and intended for use with paper milk bottles, it may be used for closing receptacles of paper or of other material.

Having thus described my invention, what I claim is:—

1. In a closure for the filling opening of a receptacle of non-metallic material, a ring of metal extending about the interior of the opening having an inwardly extending flange at the inner end of the ring and having its outer end portion outwardly turned to engage the edge of the opening, a cap of non-metallic material comprising a ring portion adapted to fit inside the metallic ring, a disk-like portion adapted to rest on the flange of the metallic ring and a retaining portion adapted to be crimped over the outer end of the metallic ring, said disk-like portion being so cut as to be readily frangible along the line of the inner edge of the flange at the inner end of the metallic ring.

2. In a closure for the filling opening of a receptacle of non-metallic material, a ring of metal extending about the interior of the opening having an inwardly extending flange at the inner end of the ring and having its outer end portion outwardly turned to engage the edge of the opening, a cap of non-metallic material comprising a ring portion adapted to fit inside the metallic ring, a disk-like portion adapted to rest on the flange of the metallic ring, and a retaining portion adapted to be crimped over the outer end of the metallic ring, said disk-like portion being so cut as to be readily frangible along the line of the inner edge of the flange at the inner end of the metallic ring, and a coating of wax-like material closing the cut.

3. A device as set forth in claim 1, including a flanged outer sealing cap of non-metallic material comprising a flanged portion adapted to fit into the ring portion of the inner sealing cap with its disk-like portion resting on the rim portion of the inner sealing cap and having its flange portion crimped over the crimped edge of the inner sealing cap.

4. A device as set forth in claim 2, including a flanged outer sealing cap of non-metallic material comprising a flanged portion adapted to fit into the ring portion of the inner sealing cap with its disk-like portion resting on the rim portion of the inner sealing cap and having its flange portion crimped over and around the crimped edge of the inner sealing cap.

ALEXANDER A. MURISON.